UNITED STATES PATENT OFFICE.

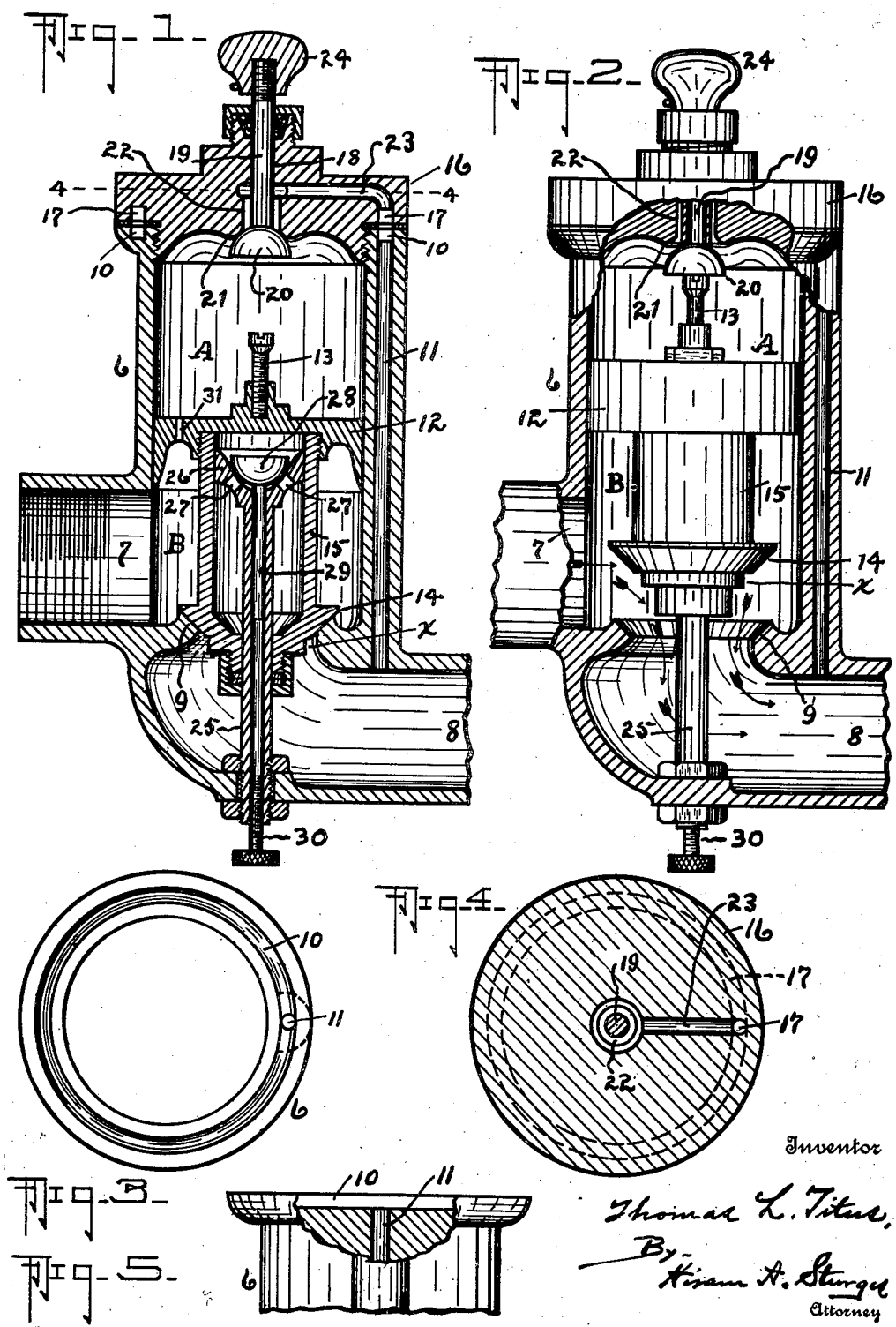

THOMAS L. TITUS, OF OMAHA, NEBRASKA.

SELF-CLOSING VALVE.

1,250,388.  Specification of Letters Patent.  Patented Dec. 18, 1917.

Application filed January 9, 1917. Serial No. 141,391.

*To all whom it may concern:*

Be it known that I, THOMAS L. TITUS, a citizen of the United States, residing at Omaha, in the county of Douglas and State of Nebraska, have invented certain new and useful Improvements in Self-Closing Valves, of which the following is a specification.

This invention relates to improvements in self closing valves, and has for one of its objects to provide a valve adapted for use in connection with fluids under pressure, which will consist of few parts so that manufacture will be convenient, practical and economical, and that durability may be attained.

Another object is to provide such a construction that, for each operation, the discharges of fluids from the valves will be uniform as to the time required. Another object is to provide means for adjustments so that the volume of the discharges may be greater or less, as may be required, the operation to be without appreciable vibration. The invention includes the use of a main valve carried by the piston and having a chamber for containing a fluid, and a stationary part in the chamber for resisting or controlling the movement of said valve and piston, and means for adjusting the stationary part longitudinally of the chamber.

In the drawing which illustrates one embodiment of the invention, Figure 1 is a view of the device in longitudinal section. Fig. 2 is a view, partly broken away and in section, showing the piston and main valve in partly elevated positions. Fig. 3 is a plan view of the cylindrical casing, the cap being removed. Fig. 4 is a transverse section on line 4 4 of Fig. 1, being a detail relating to the screw cap. Fig. 5 is a broken away, side view showing a part of the casing below the screw cap.

While the device may be employed for various purposes, it is particularly useful in connection with liquids for a control of the flow thereof, and will be described as a flush valve. Numeral 6 indicates an upright cylindrical casing, provided near its lower end with a port 7 for the intake of water under pressure, and an exit way 8 for the discharge thereof by passing the main valve seat 9.

The casing is provided, to open on its upper end, with an annular groove 10. Numeral 11 indicates a drain duct extending longitudinally of the casing, said duct being in communication at its upper end with the annular groove 10, its lower end preferably opening upon the exit way 8, below the valve seat 9.

A piston 12 is disposed within the casing and its upper end is provided with a projection, bolt or finger 13 having a threaded connection with the piston so that it may be adjusted longitudinally thereof. The main valve is indicated at 14 having a lesser area in plan than the piston, and adapted to engage the valve seat 9, said valve being provided with an annular projection $x$ at its lower end which has an area less, in plan, than the aperture of the valve seat 9, the upper end of the valve being provided with a cylindrical container 15, preferably having a threaded connection with the piston at the longitudinal axis thereof.

Numeral 16 indicates a screw cap provided with an annular groove 17, and adapted to have a threaded connection with the casing for a mounting upon the upper end thereof, with its groove 17 in register with the annular groove 10 of said casing. This screw cap is provided centrally and longitudinally thereof with an aperture 18 to provide bearings for the stem 19 of a relief valve 20, the seat for said valve being indicated at 21, and formed in the inner side of the screw cap. At 22 is indicated a chamber having a bore or area somewhat greater than the bore of aperture 18, and when the parts are assembled the chamber 22 permits an escape of a fluid from that part of the casing A above the piston, when the valve 20 has left its seat, said fluid moving from the chamber 22 to a duct 23, said duct being disposed radially of the screw cap and communicating with the annular groove 17 of said cap.

It will be understood that when the parts are assembled, the duct 23 will be constantly in communication with the chamber 22 and with the annular grooves 10 and 17. When the cap 16 is rotated for its threaded mounting upon the casing, its radially disposed duct 23 may not always be disposed above the same part of the groove 10, but since the groove 17 will be in register with the groove 10, a fluid may pass to groove 10 from said duct 23. Numeral 24 indicates a handle which is secured upon the upper end of the valve stem 19 for use when manually moving the valve 20 from its seat.

Numeral 25 indicates a stationary, tubular standard or sleeve disposed in line with the longitudinal axis of the cylindrical container 15, upon which the valve 14 constantly has bearings, the upper part of the sleeve being disposed within the container and its lower end being secured to the lower end of the casing 6, and upon the upper end of the sleeve or tubular standard is provided a valve seat 26, having apertures 27 formed therein.

At 28 is indicated a valve adapted to be disposed adjacent to and to be adjusted so that it will be disposed at selected distances from the valve seat 26, said valve being provided with a stem 29 disposed in the upper part of the tubular standard. An adjusting rod is indicated at 30, said rod being disposed in the lower part and having a threaded connection with the tubular standard, as best shown in Fig. 1. By rotating the rod 30 in one direction, its upper end may engage the lower end of the stem 29, and a further rotation, obviously, will cause the valve 28 to be elevated above its seat.

If the container 15 is filled with oil or other liquid it is obvious that when the piston and valve 14 move upwardly, the oil or other liquid will move from the lower to the upper part of the container by passing the apertures 27, the valve 28 moving upwardly to permit the liquid to flow freely through said apertures, and therefore the stationary valve seat does not operate to limit the desired rapid upward sliding movement of the piston and valve 14 to any appreciable extent.

However, when the piston and valve 14 move downward in the casing 6, it will be noted that the pressure of the liquid in the container upon the valve 28 will cause said valve to be disposed in its lowermost position with reference to the valve seat 26 to restrict the flow of said liquid through the apertures 27 for retarding the downward movement of the piston.

If the downward movement of the piston and valve 14 is retarded the flushing, of course, will be continued for a greater length of time; and an adjustment may be made, by use of the rod 30 so that the duration of the flushing will be less, this being an obvious advantage in operation; another advantage being that water pressure is not always uniform, and the means herein described for controlling the duration of the flushing and the downward movement of the valve 14 to its seat is independent of the degree of water pressure. The container may be air tight and if desired air may be used in the container, but oil is preferred.

It will be understood that when the valve 14 is disposed on its seat 9, chambers A and B or the parts within the casing, respectively, above and below the piston, will be filled with water, and the by-pass 31 of the piston will be similarly filled, the pressure tending to maintain the valves 14 and 20 on their seats.

In operation a pressure may be manually applied to the handle 24, which will cause a downward sliding movement of the valve stem 19 to cause the valve 20 to leave its seat. Water will then move upwardly through the chamber 22 into the duct 23, and thence into the grooves 17 and 10 and will then move downwardly through the drain duct 11 and will pass into the passageway 8.

As soon as the valve 20 leaves its seat, the piston will at once slide upwardly, since its area, in plan, is greater than the area, in plan, of the valve 14, the water then moving freely from the chamber B and from the intake 7 to pass the discharge passageway 8 of the casing, said valve 20 remaining open until it is moved upwardly by the projection 13, after its flat lower surface has been engaged by said projection.

When the valve 20 has been moved to its seat, the piston and valve 14 together with the container 15 will move downwardly until the valve 14 reaches its seat this being caused by suction or passage of the water under pressure through the lower passageway 8, and the weight of the parts named, and movement of water upwardly through the by-pass 31, the stationary valve seat 26 also operating to retard the downward movement of the piston, as explained. The by-pass may be dispensed with, of course, if the piston has a diameter somewhat less than the bore of the casing 6.

It will be seen that the quantity of water required for causing the valve 20 to move to its seat will depend, in part, upon the distance to which the finger or bolt 13 projects above the piston regardless of the degree of water pressure, and since the finger may be adjusted longitudinally of the piston on account of its threaded connection therewith, the quantity of water required for operating the valve 20 may be under convenient control; and the time required for permitting water to flow through the discharge passageway 8 will depend upon the adjustments provided for the finger or bolt 13 and the rod 30.

Since no spring or retracting means is provided for the operation of the valve 20, it will remain open after it has been pressed downward, and it will be appreciated that its operation will be positive for permitting a continued flow until the upward movement of the piston causes a closure of said valve.

The annular projection or collar $x$ upon the lower end of the valve 14 may have any desired length, and it will be understood that it operates to restrict the flow of water through the valve seat 9 during the downward movement of said valve, immediately before this valve reaches its seat. One of the objections to be overcome in the operation of flush valves generally, is the attendant vibration caused by the movements of valves from excessive water pressure. It will be appreciated that the container 15 and parts connected therewith provide means, entirely separate from other parts, for controlling the valve 14 in its movements to its seat regardless of the degree of water pressure, the projection $x$ also aiding in this function.

Having fully described my invention, what I claim and desire to secure by Letters Patent is,—

1. In devices for the purpose described, a cylindrical casing provided with an intake, a discharge passageway having a valve seat, a second discharge passageway having a valve seat and communicating with the first discharge passageway, a valve for the valve seat of the second discharge passageway, a piston having a by-pass and arranged for movements intermediate the intake and valve seat of the second discharge passageway, a main valve for the valve seat of the first named passageway, said main valve being provided with an air-tight container and being movable with the piston, a stationary valve seat in the container, and a valve for the stationary valve seat of said container.

2. In devices for the purpose described, the combination with an upright casing having a lower discharge passageway and an upper discharge passageway, each being provided with a valve seat, and having an intake port intermediate said valve seats, of a piston arranged for reciprocation between the intake port and valve seat of the upper discharge passageway, a valve for the upper discharge passageway, a main valve for the valve seat of the lower discharge passageway, an air tight container connecting the main valve with the piston, a valve seat within and having a tubular part projecting outwardly of the container, a valve in the container and having a stem disposed in the tubular part of the valve seat, and a threaded member rotatable for disposing the last named valve at selected distances from its seat.

In testimony whereof, I have affixed my signature in presence of two witnesses.

THOMAS L. TITUS.

Witnesses:
HIRAM A. STURGES,
ARTHUR H. STURGES.